United States Patent [19]

Cronce et al.

[11] Patent Number: 5,588,572
[45] Date of Patent: Dec. 31, 1996

[54] ARTICLE CARRIER

[75] Inventors: Gary M. Cronce, Port Huron; Craig A. Stapleton, Troy, both of Mich.

[73] Assignee: Advanced Accessory Systems LLC, Port Huron, Mich.

[21] Appl. No.: 521,843

[22] Filed: Aug. 31, 1995

Related U.S. Application Data

[63] Continuation of Ser. No. 187,449, Jan. 26, 1994, abandoned.

[51] Int. Cl.$^6$ ........................................................ B60R 9/00
[52] U.S. Cl. .......................................... 224/321; 224/326
[58] Field of Search .................................... 224/309, 321, 224/325, 326, 329, 330, 331, 315

[56] References Cited

U.S. PATENT DOCUMENTS

| | | | |
|---|---|---|---|
| Re. 26,309 | 11/1967 | Heard | 105/369 |
| Re. 26,538 | 3/1969 | Bott | 224/42.1 |
| Re. 26,539 | 3/1969 | Bott | 224/42.1 |
| Re. 32,706 | 7/1988 | Bott | 224/324 |
| D. 319,810 | 9/1991 | Stapleton et al. | |
| 725,577 | 4/1903 | Miller | |
| 2,121,531 | 5/1936 | Murphy | 292/170 |
| 3,227,102 | 1/1966 | Shook | 105/369 |
| 3,554,416 | 1/1971 | Bott | 224/42.1 |
| 3,721,200 | 3/1973 | Schmidt | 105/369 |
| 3,774,939 | 11/1973 | Freads et al. | 280/179 |
| 3,782,295 | 1/1974 | Balinksi | 105/369 |
| 3,912,894 | 10/1975 | Mullen et al. | 200/153 |
| 3,952,671 | 4/1976 | Verde | 105/498 |
| 4,132,335 | 1/1979 | Ingram | 224/42.1 |
| 4,225,068 | 9/1980 | Ingram | 224/325 |
| 4,239,138 | 12/1980 | Kowalski | 224/321 |
| 4,244,501 | 1/1981 | Ingram | 224/324 |
| 4,279,368 | 7/1981 | Kowalski | 224/326 |
| 4,372,469 | 2/1983 | Kowalski et al. | 224/321 |
| 4,406,386 | 9/1983 | Rasor et al. | 224/321 |
| 4,448,337 | 5/1984 | Cronce | 224/321 |
| 4,469,261 | 9/1984 | Stapleton et al. | 224/321 |
| 4,516,710 | 5/1985 | Bott | 224/324 |
| 4,616,772 | 10/1986 | Mareydt | 224/326 |
| 4,650,383 | 3/1987 | Hoff | 410/149 |
| 4,684,048 | 8/1987 | Bott | 224/326 |
| 4,754,905 | 7/1988 | Bott | 224/326 |
| 4,899,917 | 2/1990 | Bott | 224/326 |
| 4,967,945 | 11/1990 | Bott | 224/326 |
| 4,982,886 | 1/1991 | Cucheran | |
| 5,007,570 | 3/1991 | Himmel | 224/321 |
| 5,010,780 | 1/1991 | Hatfield | 74/501.5 |
| 5,071,050 | 12/1991 | Pudney et al. | |
| 5,082,158 | 1/1992 | Bott | 224/321 |
| 5,170,920 | 12/1992 | Corrente et al. | |
| 5,190,198 | 3/1993 | Cucheran | |
| 5,203,483 | 4/1993 | Cucheran | 224/321 |
| 5,205,453 | 4/1993 | Pudney et al. | |
| 5,232,138 | 8/1993 | Cucheran | 224/321 |
| 5,385,285 | 1/1995 | Cucheran et al. | 224/326 |

FOREIGN PATENT DOCUMENTS

| | | |
|---|---|---|
| 0573143 | 8/1993 | European Pat. Off. |
| 0573143A1 | 12/1993 | European Pat. Off. |
| 1329943 | 7/1962 | France |
| 3102736A1 | 9/1982 | Germany |
| 672749 | 10/1964 | Italy |
| WO90/03288 | 4/1990 | WIPO |

*Primary Examiner*—Linda J. Sholl
*Attorney, Agent, or Firm*—Rader, Fishman & Grauer PLLC

[57] ABSTRACT

An article carrier for attachment to an automobile rooftop including a pair of luggage roof rails rhine to the rooftop, each roof rail having at least one detent disposed therein, an elongated crossbar having a first end and a second end, a pair of support members for slidably connecting the crossbar to the roof rails, one of the pair affixed to the first end of the crossbar and the other of the pair connected to the second end of the crossbar each support member including, a track follower on the support slidably engaging the track, a latch for releasably positioning the support member along the track at the at least one detent, the latch having a protrusion and a protrusion support that selectively positions the protrusion in a recessed position wherein the support member is freely slidable along the track, and a latched position wherein the protrusion is urged toward engagement with the at least one detent for securing the support at a fixed position along the track, means for resiliently urging the protrusion support to the latched position and a retainer for selectively maintaining the protrusion in the recessed position.

15 Claims, 6 Drawing Sheets

ARTICLE CARRIER

This is a continuation of application Ser. No. 08/187,449 filed on Jan. 26, 1994 now abandoned.

TECHNICAL FIELD

The present invention relates generally to article carriers for automobiles and, in particular, to roof top article carriers including roof rails and an extending crossbar that is movable within a range of positions along the roof rails.

BACKGROUND ART

Those skilled in the art will recognize that the use of automobile article carriers is becoming more prevalent as the consumer turns more to automobile travel for vacationing and related sports activities. Individual travel requiring transportation of attendant luggage is increasing. At the same time, due to economic and energy efficiency considerations, interior space for luggage and the like is decreasing as automobiles become smaller and more fuel efficient. As such, more attention is being turned to alternative modes of transporting baggage and sports equipment. With this increased attention, more effort is being expended studying the problems associated with current rooftop article carrier technology.

The article carriers discussed above commonly include a pair of spaced apart luggage roof rails affixed to the rooftop of the automobile. A crossbar is further provided, extending perpendicularly between the spaced roof rails, to afford the consumer a support structure to tie down or affix the luggage onto the rooftop. While the crossbar must be secured to the roof rail to fix the load on the carrier, a permanently mounted crossbar does not permit the carrier to be particularly configured for secure engagement of various shapes of different loads and is thus undesirable.

Problems related to the undesirable characteristics of conventional, sliding crossbar, rooftop article carriers include, among other problems, difficulties in ease of movement of the bar along the rails to accommodate different size loads, poor locking mechanisms that fail to hold the crossbar in the desired position and weak connections between the crossbar and the roof rails. Additionally, some crossbar assemblies require complicated steps for releasing the locking mechanism, for example, those crossbar assemblies that require use of a screwdriver or other like tool for engaging fasteners and loosening jaw-like clamping mechanisms before the crossbar can be moved.

Known improvements allowing the track to adjust according to the size and shape of the luggage, sports equipment or the like to be transported, include a crossbar mounted for adjustable retention along the roof rails. This slidability or adjustability is limited by the adjustment system provided. One such system utilizes a plurality of spaced apart apertures or holes correspondingly located on the inner sides of the facing roof rails. Spring loaded dowels or knobs are provided on the opposing ends of the crossbar which cooperate with the apertures to secure the crossbar in the numerous lateral positions provided along the length of the roof rails.

Continuously spring loaded dowels create special problems in the article carrier system because they are not securable or lockable in a recessed position. Therefore, it is necessary to manually compress the spring loaded dowel in some fashion on each end of the crossbar each time the crossbar is to be moved from one adjacent position on the roof rail to the next. Thus one individual must continually travel back and forth from each side of the automobile to move the entire crossbar laterally along the roof rails. This operation is tedious, impractical and tends to reduce the useful value of the article carrier to the average consumer.

Another type of rack or carrier that has been used is disclosed in U.S. Pat. No. 5,170,920 issued to Masco Corporation. U.S. Pat. No. 5,170,920 discloses a luggage carrier having spring-loaded plunger system disposed on a stanchion for locating and securing the cross-bar assemblies. The spring-loaded plunger system, as discussed above, requires an operator to manually actuate a lever to manually remove a spring-loaded plunger from slots disposed in the roof-top side rails. Constant pressure must be applied on both sides of the cross-bar at the lever position to move the entire cross-bar along the side rails.

U.S. Pat. No. 5,205,453 to Masco Industries, Inc. discloses another type of stanchion for use with an article carrier. The stanchion includes a retractable lock pin which can engage a plurality of oblong apertures formed in a side rail. A push button is provided for engaging a toggle or lever link which lifts the retractable lock pin when the button is pushed. A spring is provided for normally biasing the push button into a position substantially flush with the outer surface of the stanchion and for urging the retractable pin into a locked position. Again, constant application of pressure is required to remove the pin from the oblong aperture so that the entire crossbar is movable along the side rails.

SUMMARY OF THE INVENTION

The present invention resolves the previously encountered problems by providing a crossbar having a selectively controllable latch for releasably positioning the crossbar along a longitudinal roof rail. In general, the crossbar is used in conjunction with an article carrier including at least one roof rail, preferably two, each having a plurality of detents. At least one end of the crossbar carries the latch and a retainer for selectively retaining a contact in a recessed position spaced apart from the detents. The latch comprises an actuator and an engager responsive to the actuator for positioning the contact in a latched position, where the contact is engaged with the detent, and the recessed position where the contact is disengaged from the detent.

Preferably, the crossbar includes a latch having an external actuator and an engager comprising a contact in the form of a protrusion that fits within an opening forming the detent in the rail. Movement of the actuator, preferably in the form of a lever, cause the engager to selectively position the protrusion at and between a recessed position wherein the crossbar is freely slidable along the roof rail, and a latched position wherein the protrusion is urged toward engagement with the rail for engagement with the detent for securing the crossbar at a fixed position along the roof rail.

Still more preferably, the roof rail includes a track extending along a portion of the roof rail and the at least one detent is disposed on the track and the cross bar further includes a track follower for slidably engaging the track and movably securing the crossbar to the roof rails.

Also, the retainer preferably comprises a prong extending from the crossbar adapted to cooperate with a flange extending from the lever to maintain the lever in either the latched position or the recessed position.

It is an object of the present invention to provide a cross bar which is manually positionable along the roof rails from a freely slidable position to a fixed position.

It is a further object of the present invention to provide a cross bar including a latch which is manually positionable and retainable from a recessed position where the crossbar is a freely slidable along the roof rails to a latched position where the cross bar is fixed along the roof rails.

The above objects, features and advantages of the present invention, as well as others, are readily apparent from the foregoing detailed description of the invention in view of the drawings.

BRIEF DESCRIPTION OF THE DRAWINGS

The present invention will be more clearly understood by reference to the following detailed description when read in conjunction with the accompanying drawing in which like reference characters refer to like parts throughout the views and in which.

DETAILED DESCRIPTION OF THE PREFERRED EMBODIMENT

Figure 1:
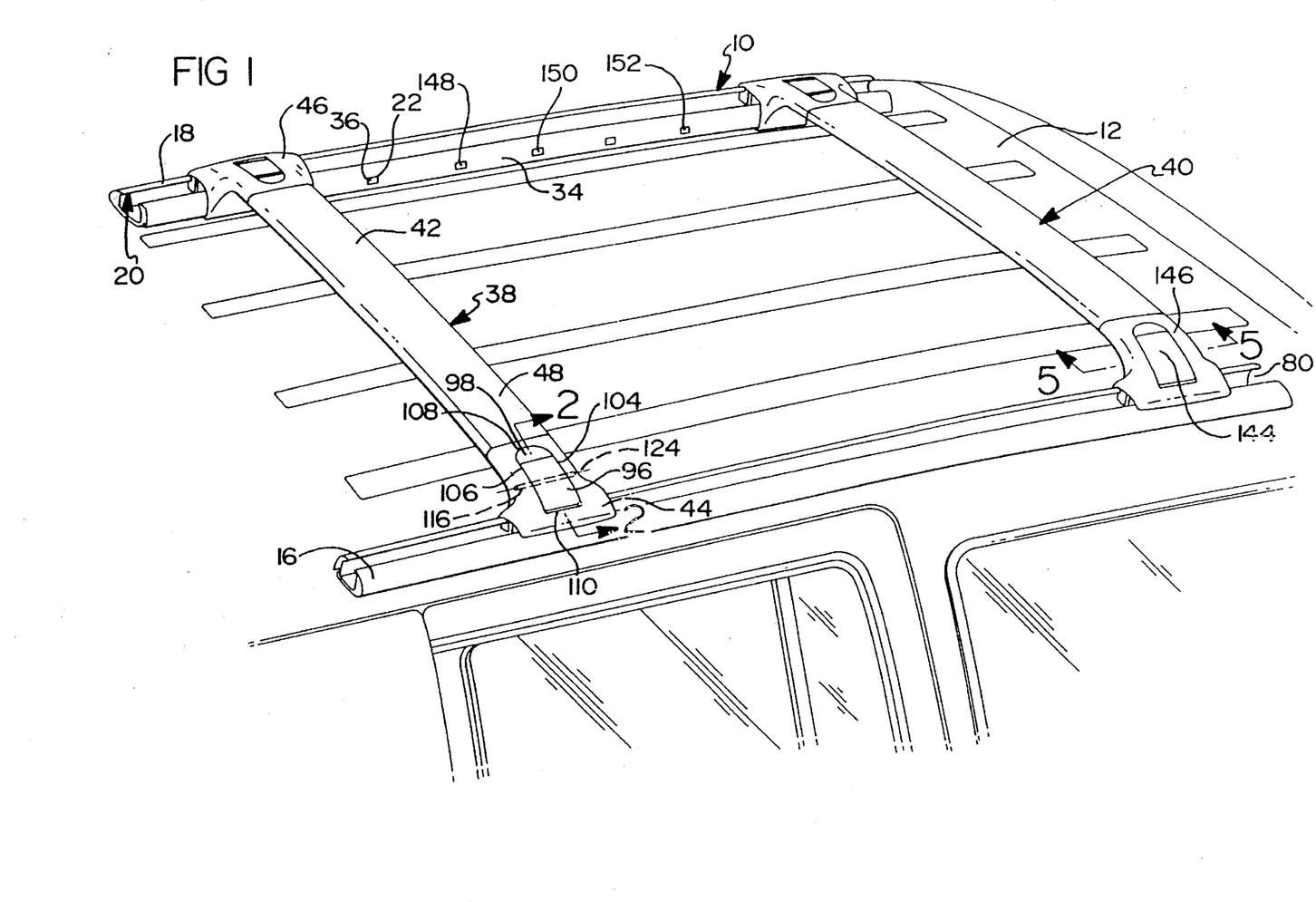
FIG. 1 is a top perspective view of a article carrier system with a crossbar constructed according to the present invention.

Illustrated in FIG. 1 is an article carrier 10 of the present invention. The article carrier 10 is shown affixed atop an automobile roof top 12. The article carrier 10 includes a pair of parallel roof rails 16 and 18.

Preferably, each roof rail 16 and 18 generally includes a track 20 extending along a portion of the rails 16 and 18. Generally, each roof rail 16 and 18 includes a plurality of spaced apart detents 22, each detent preferably comprising an opening 36 in a rail wall. Each detent on rail 16 is positioned in longitudinal registration with a detent 22 on the opposite rail. In the preferred embodiment, track 20 of each of the roof rails 16 and 18 further includes a first track segment 21 and a second track segment 24. Nevertheless, the track 20 may be formed by one of the track segments or may be formed by any means for maintaining a predetermined origination of the crossbar with the rail as it slides along the rail.

Figure 2:
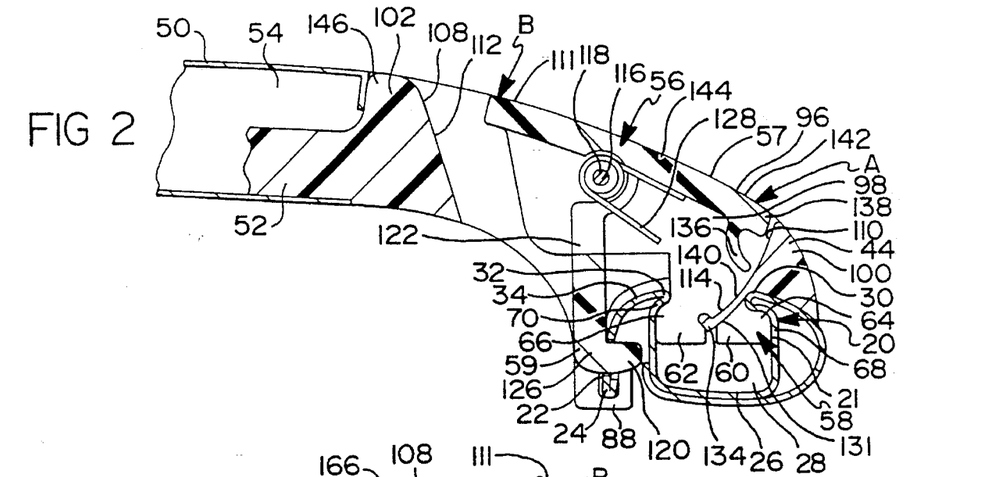
FIG. 2 is a fragmented, cross sectioned view taken substantially along line 2—2 in FIG. 1 showing a crossbar latch in a latched position.

As shown in FIG. 2, the first track segment 21 is preferably defined by an arcuate channel 26 having an enclosed cavity portion 28. Channel 26 has opposing upper lip portions 30 and 32. As can be seen, arcuate channel 26 is formed in the preferred embodiment of a rolled formed piece of material.

Figures 3, 4:
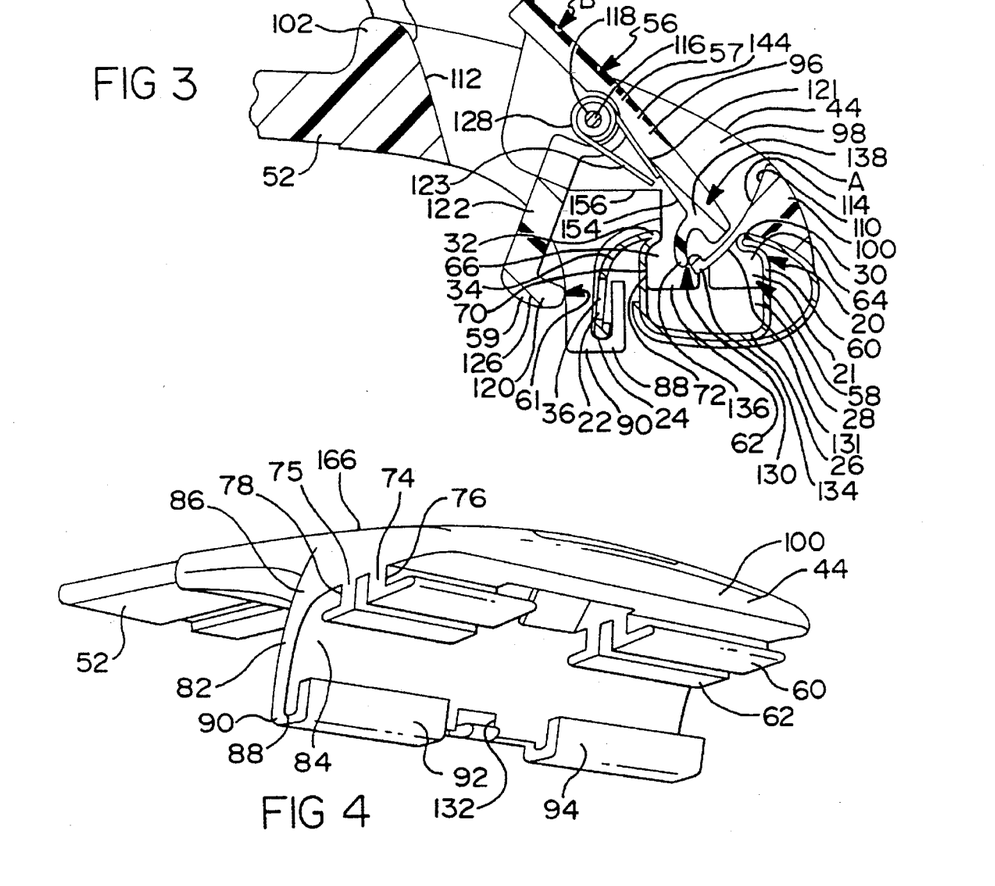
FIG. 3 is a fragmented, cross sectioned view similar to FIG. 2 but showing the crossbar latch in the recessed, free sliding position.
FIG. 4 is an bottom perspective view of the crossbar portion shown in FIGS. 2 and 3 but removed from the carrier rail.

As shown in FIGS. 2 and 3, second track segment 24 extends from one lip portion 32. The second track segment 24 is adapted to extend parallel to channel 26 and comprises an elongated wall segment 34. In the preferred embodiment, detents 22 are disposed within the second track segment 24. Each detent 22 comprises an opening 36 defined within elongate walls segment 34.

A pair of crossbars 38 and 40 are shown extending from roof rail 16 to roof rail 18. The crossbars 38 and 40 preferably have a track follower for stabilized sliding engagement along the rails 16 and 18. In the preferred embodiment, each crossbar 38 and 40 generally comprises an assembly 42 that includes a pair of stanchions 44 and 46, shown in more detail in FIGS. 2 through 4, and an elongated member 48. In the preferred embodiment, the elongated member 48 is manufactured from a hollow tube 50 and is connected to and extends from the stanchion 44 to the stanchion 46. Referring to FIG. 4, stanchion 44 preferably includes a connecting section 52 which is adapted to be received within a hollow chamber 54 of tube 50 and thereby connects the support member 44 to the hollow tube 50.

In the article carrier illustrated in FIG. 1, each of the stanchions 44 and 46 carry a latch 56. The stanchions 44 and 46 are identical in structure and operation, and therefore reference to the structure of stanchion 44 is exemplary of stanchion 46 shown. Referring now to FIGS. 2 and 3, support member 44 is shown more specifically having a track follower 58. In the preferred embodiment, a track follower segment 58 is formed by a pair of legs 60 that correspond with the shape of the wall defining enclosed cavity portion 28.

The legs 60 and 62 each include a shoulder portion 64 and 66, each designed to cooperate with the curved walls 68 and 70 of the rail, forming an inner surface 72 of cavity 28. Preferably, the shoulder portions 64 and 66 each include a neck 74 and 75 respectively, connecting the shoulder portions 64 and 66 to the stanchion 44. Each neck has an outer surface 76 and 78. The necks are positioned such that the outer surfaces 76 and 78 define a distance which is slightly less than the distance between the opposing lip portions 30 and 32 of the roof rail 16, for free movement of the stanchion along the rail.

In this manner, the shoulder portions, when operatively engaged within the cavity 28, and in contact with curved walls 68 and 70 of the roof rail, cannot be vertically displaced through the open end 80 of cavity 28 for removal from the roof rail. Only lateral or horizontal movement of the stanchion is therefore allowed with this preferred construction. However, other types of cooperating structures connecting a track follower 58 to a track 20 of a roof rail, that permit the crossbar to be freely slidable along the roof rail 16, are within the scope of the present invention.

Additionally, in the preferred embodiment, stanchion 44 includes a track follower segment 82 having a curved outer wall 84. The curved outer wall 84 is preferably shaped to correspond with roof rail 16, for example, surface 34. The track follower segment 82 is connected at one end 86 to the stanchion 44 as shown in FIGS. 2, 3 and 4 includes a track channel 88 formed on the opposite end 90. The track channel 88 is dimensioned to receive the second track segment 24 of roof rail 16 as illustrated in FIGS. 2 and 3. In the preferred embodiment, the track channel 88 is formed by a pair of spaced, substantially identical portions 92 and 94.

Referring now to FIGS. 1 through 3, stanchion 44 includes the latch 56 for releasably positioning the stanchion 44 along the track segments 21 and 24. The latch 56 generally comprises an external actuator 57 and an engager 59. The external actuator 57 generally provides the user with a means for operating the engager 59 from outside the latch 56. In the preferred embodiment, for example, the external actuator comprises a lever 96 pivotably secured to the stanchion 44. The lever 96 is supported within an opening 98 of the stanchion 44.

In the preferred embodiment, opening 98 extends from a front body portion 100 to a rear body portion 102. The opening 98 includes opposing side walls 104 and 106, rear side wall 108, and front side wall 110. The rear side wall 108 has a sloping portion 112 and the front side wall 110 has a curved portion 114.

Also in the preferred embodiment, the lever 96 is pivotally supported in the opening 98 by pivot pin 116 received through bore 118 in lever 96. The pivot pin 116 extends across opening 98 from side wall 104 to side wall 106. The side walls 104 and 106 include apertures which support the pivot pin 116. The pivot pin 116 is preferably made of stainless steel but the lever 96 may be pivoted in another manner. The actuator may be constructed in another manner which exposes it externally of the bar without departing from the present invention.

Preferably, the engager 59, of latch 56 includes a contact adapted to connect with or otherwise engage the roof rails 16 and 18. The engager selectively positions the contact 61 at a recessed position disengaged from the roof rails 16 and 18, where the crossbar is freely slidable along the roof rails 16 and 18, and further selectively positions the contact in a latched position engaging the roof rails at the detents 22. In the preferred embodiment, the engager 59 comprises a protrusion 120 and protrusion support arm 122, with the protrusion 120 forming the contact 61 of the engager 59.

The protrusion 120 is carried by the support arm 122 formed on lever 96. Protrusion support arm 122 extends at an angle from lever 96 and is moved about axis 124, shown in FIG. 1, correspondingly in relation to any movement in lever 96. Protrusion 120, in the preferred embodiment shown in FIGS. 2 and 3, extends from the end segment 126 of protrusion support arm 122. As shown, lever 96, protrusion support arm 122 and protrusion 120 are preferably constructed from one piece of material although interconnecting separate pieces are also within the scope of the present invention.

The protrusion 120 is preferably configured to be received within an opening 36, with the form of an elongated slot, forming a detent 22 of the roof rail 18. Opening 36 locates support arm 122 and protrusion 120 along roof rail 18. Preferably, protrusion 120 and protrusion support arm 122 are resiliently urged toward detent 22 by a biasing means. Any biasing means capable of urging the protrusion support arm toward the detent 22 is within the scope of the invention. In the preferred embodiment, the biasing means is a spring 128.

Figure 5:
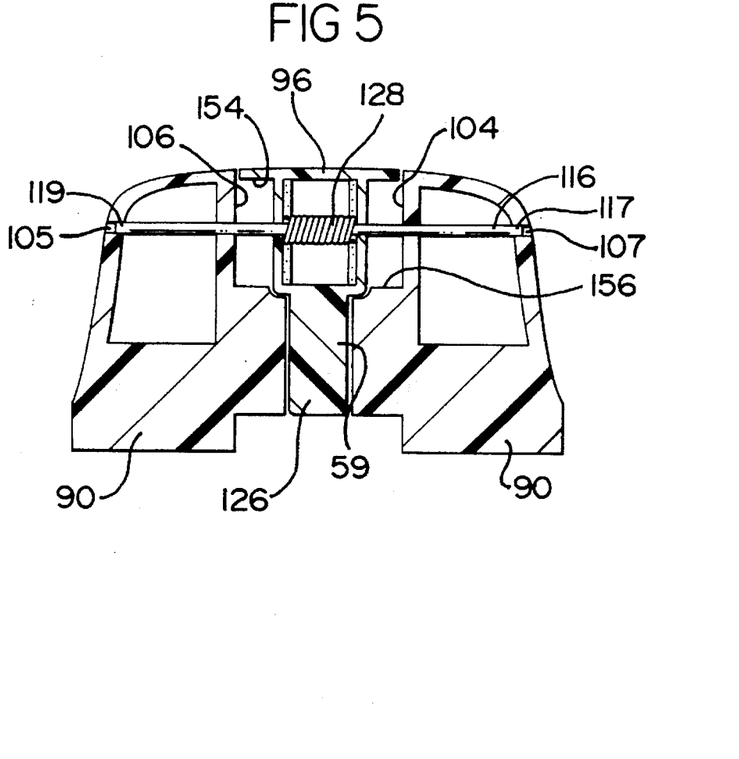
FIG. 5 is a cross sectional view taken along lines 5—5 of FIG. 1.

The biasing spring 128 is of conventional manufacture and is dimensioned large enough to fit over the pivot pin 116. Biasing spring 128, in the preferred embodiment, is a helical spring. As shown in FIG. 5, the pivot pin ends 117 and 119 are supported within bores 105 and 107 defined in opposing walls 104 and 106 respectively.

As can be seen in FIG. 3 and 5, biasing spring 128 is compressible and operates to urge the support arm 122 and thus the protrusion 120 toward rail 10 or against a registering detent 22. Spring arm 121 abuttingly engages the under surface 154 of lever 96 and spring arm 123 abuttingly engages the center wall 156 of stanchion 44. Compression of biasing spring 128 by pushing lever end 111 of lever 96 downwards creates a counterclockwise rotational force on lever 96. Stanchion 44 also includes a retainer 130 for selectively maintaining the protrusion 120 in the recessed position as shown in FIG. 3.

In the manner described above, latch 56 selectively positions protrusion 120 between a recessed position, as shown in FIG. 3 where the crossbar 38 is freely slidable along the track 21 and a latched position as shown in FIG. 2. In the latched position, protrusion 120 rides against the rail wall segment 34 shown in FIGS. 1 and 2 until the protrusion 120 registers with and extends into detent 22 and secures stanchion 44 in a fixed positioned along the rails 16 and 18. The preferred embodiment of the present invention shown in FIGS. 2 through 4 includes a generally inverted, "U" shaped opening 132 cut away from track follower segment 82. Opening 132 is located on curved wall portion 84, on segment 82 so that protrusion 120 can extend into detent 22.

The retainer 130 for selectively maintaining the contact in the recesses position, comprises a prong 134 extending from the front body portion 100 of the support member 44 in the preferred embodiment. Prong 134 is designed to cooperate with and maintain lever 96 in either of a latched position, or a recessed position. In the latched position, contact 61 is urged towards engagement with detent 22, for example, protrusion 12 will be received in opening 36 when aligned with the detent, by biasing spring 128. In the recessed position, contact 61 is disengaged from the detent 22, for example, protrusion 120 is retracted from opening 36. Prong 134 is resiliently urged by the biasing spring 128 into an interference position within the arc of movement of a flange 136 positioned on the lever 96.

More specifically, the lever 96 includes a flange 136 which extends from one end 138 of lever 96. Flange 136 is positioned such that movement of lever 96 about pivot pin 116 causes prong 134 to slidingly engage flange 136. As shown in FIG. 3, flange 136 is positioned beyond side 140 of prong 134 when lever 96 is positioned as shown in FIG. 3. Prong 134 retains flange 136 in this position as the spring force of the flange exceeds the counterclockwise rotational force generated by the biasing spring 128, and selectively maintains the protrusion 120 in the recessed position. Thus, the support member 44 shown in FIG. 3 is freely slidable along rail 18.

Referring again to FIG. 2, pivoting of lever 96 moves flange 136 so that it may be positioned on side 140 of prong 134. This is accomplished by application of pressure on lever 96 at end 111 to cause the lever to pivot about pivot pin 116. Flange 136 engages and slides over prong 134, thereby engaging protrusion 120 with detent 22 and securing support 44 at a fixed position along rail 18. Prong 134 and flange 136 are elastically deformed as flange 136 passes from the position shown in FIG. 1 to the position shown in FIG. 2. Prong 134 returns to its normal position after disengaging from flange 136 as the flange moves toward the position shown in FIG. 2.

Prong 134 and flange 136 are preferably manufactured from a material having a resiliency or elasticity that will withstand numerous movements of the lever from the recessed to latch position and vice-versa. In the preferred embodiment, the prong is reinforced with a metallic spring 131 which increases the strength and durability of prong 134.

Thus, application of pressure in a direction illustrated by arrow A in FIG. 3 moves latch 56 from the recessed position to the latched position shown in FIG. 2. Application of pressure in a direction illustrated by arrow B correspondingly moves the latch 56 from the latched position back to the recessed position.

It is preferred that the support member 44 and track follower 58 be manufactured from one piece of material. It is further preferred that at least portions of the latch and the external actuator also be manufactured from one piece of material. More specifically, in the preferred embodiment, the lever, protrusion support arm and protrusion are all manufactured from a single unitary piece of material.

The support member 44 and latch 56 may be manufactured from any synthetic material with the preferred material being a polymer such as, nylon STA 801. The crossbar of the present invention may be manufactured in one piece with one or both support members, but the preferred embodiment uses a interfitting crossbar manufactured from aluminum. The roof rails of the article carrier assembly are preferably manufactured from metal and more specifically from roll formed aluminum.

Referring back to FIGS. 2 and 3, preferably the lever 96 has an outer surface 144 that matches or corresponds to the contour of the outer surface 146 of the support member 44. Thus the lever 96 and support member 44 have a corresponding outer contour which is aesthetically pleasing, yet functional as the lever action of latch 56 is not affected significantly by the outer contour of the lever 96.

In addition, the amount of interference between the flange 136 and the prong 134, the resiliency of the material used to manufacture flange 136 and prong 134 and the strength of spring support 131 will determine the ease of manual operation by the user. Less interference may be achieved by the shortening the length of the flange 136 as it extends toward the prong 134 or correspondingly shortening the length of the prong 134, thereby making the lever easier to depress, i.e. easier to latch and unlatch. As discussed, manufacturing the prong 134, the flange 136 or both from a more resilient, softer material will also make the lever easier to manually latch and unlatch. In the preferred embodiment, the amount of interference between flange 136 and prong 134 is approximately 1.0 to 2.0 millimeters.

In the preferred embodiment of the present invention, the flange 136, prong 134, latch 56 and the support member 44 are all manufactured from a polymer. More preferably, the flange 136, prong 134, latch 56 and the support member 44 are all manufactured from a commercially available thermoplastic known as ZYTEL® ST801. ZYTEL® is a registered trademark of Du Pont Company. In an equilibrated state, i.e. (the polymer equilibrated with the atmosphere at 50% relative humidity) and at a temperature of 23 degress Celsius, a flexural modulus of approximately 862 MPa and a tensile strength of 41.4 MPa is provided by ZYTEL® ST 801.

Referring now to FIGS. 6 through 9, roof rail 16 is supported above vehicle roof 12 by a pair of end caps 160 and 162. Ends caps 160 and 162 are connected to ends 164 and 166 of roof rail 16, respectively. In the preferred embodiment, the end caps are snap fit on the ends 164 and 166. More specifically, end cap 160 includes at least one expandable connector 165 which extends out from the surface 168 of cap 160. Connector 165 extends through hole 169 of roof rail 16. In this manner, the roof rails are affixed to the end caps. The end caps 160 and 162 are further affixed to the vehicle roof 12 by any conventional screw fasteners.

Figure 6:
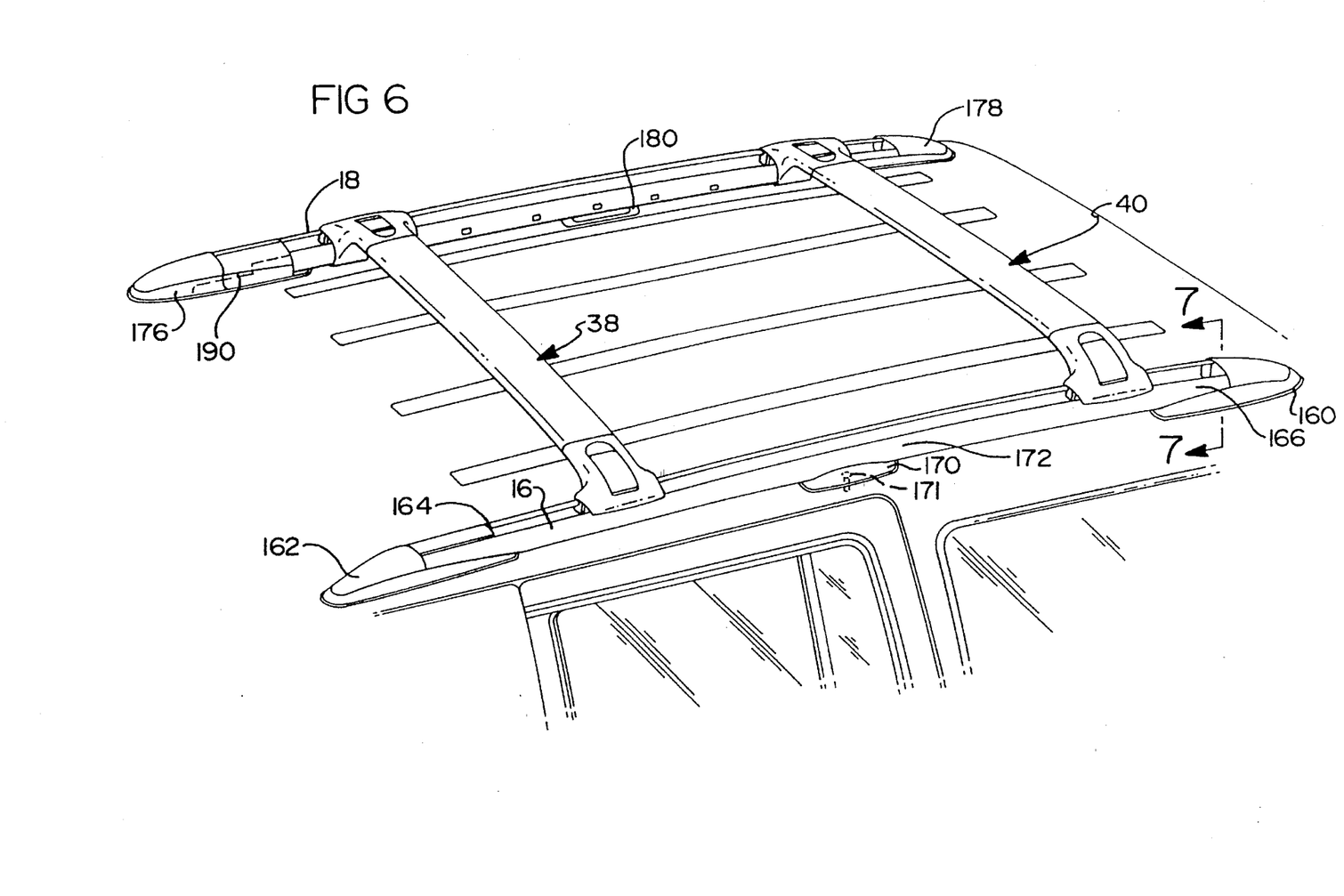
FIG. 6 is a top perspective view of an alternative article carrier system of the present invention.
Figure 7:
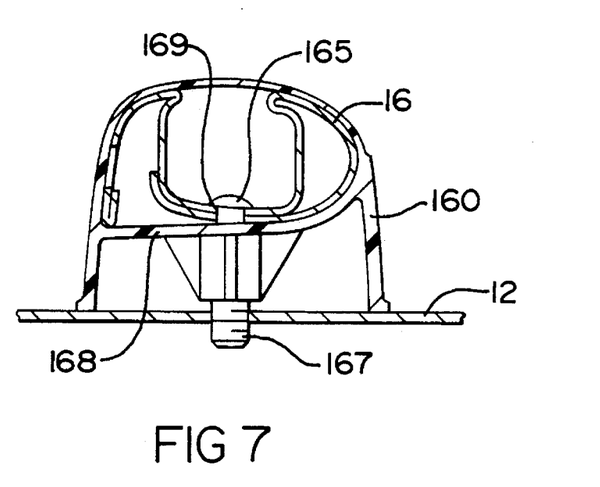
FIG. 7 is a cross sectioned view taken substantially along line 7—7 in FIG. 6.
Figure 8:
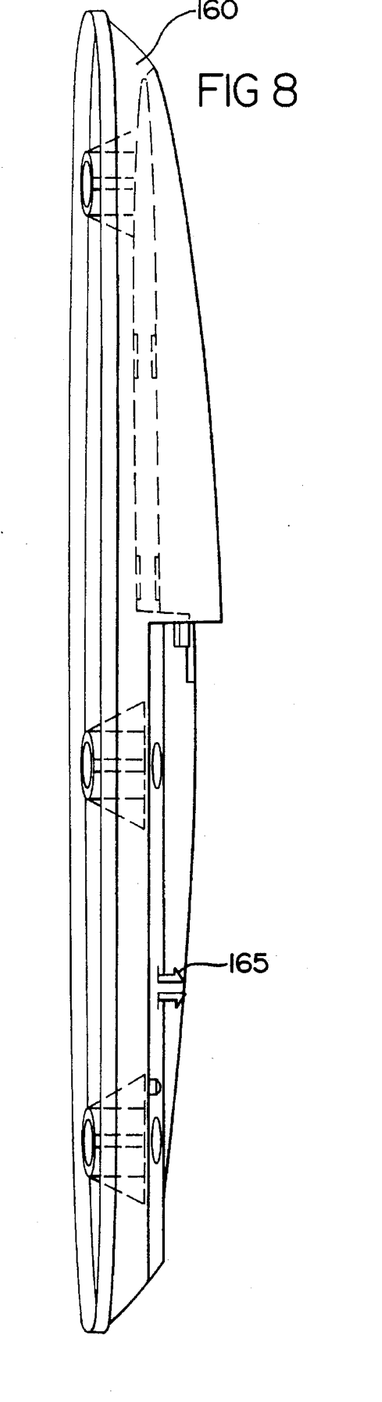
FIG. 8 is a side view of the end cap of the present invention.
Figure 9:
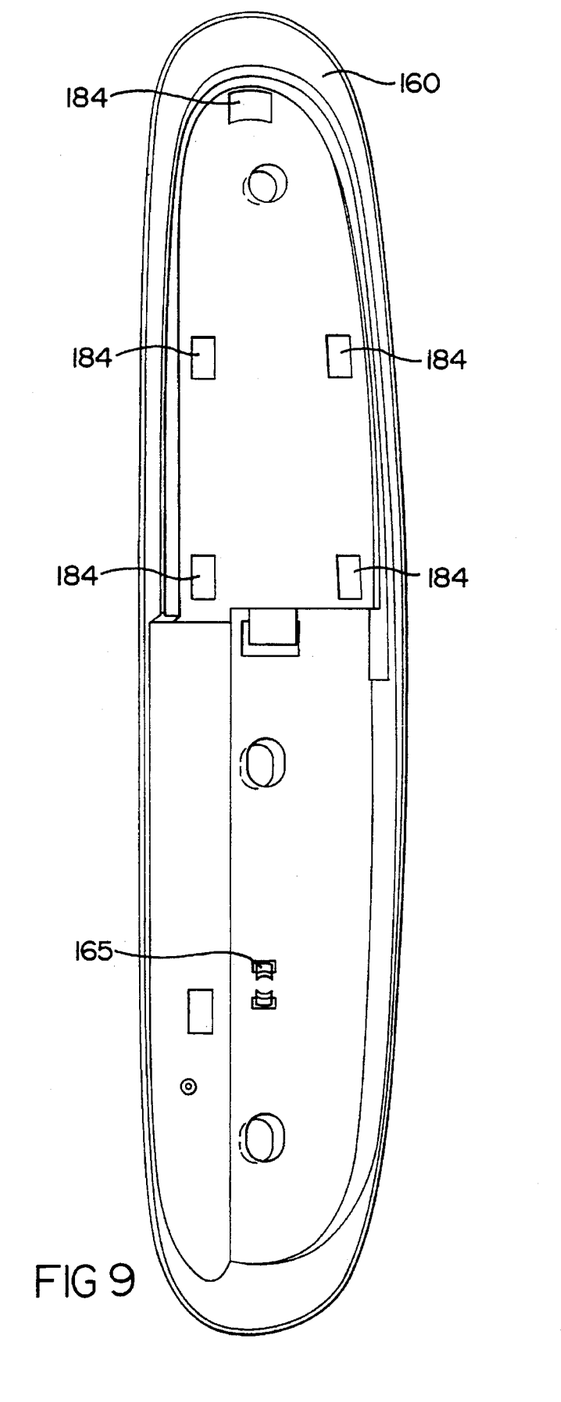
FIG. 9 is a top view of the end cap of the present invention.

A central support foot 170 is shown in FIG. 6, located below the central portion 172 of the roof rail 16. The support foot 170 is also preferably connected to the roof rail. The support foot 170 is, in the preferred embodiment, connected to roof rail 16 in a snap fit relation. The support foot is also affixed to the roof 12 by convention screw fasteners. In this manner the entire roof rail 16 is raised above the roof 12 in such a manner as to facilitate easy movement of the crossbar 38 along to the rails 16 and 18. As shown in FIG. 6, roof rail 18 is similarly supported above roof 12 by a pair of end caps 176 and 178, and a central support foot 180 in the manner discussed above with respect to roof rail 16.

Figure 10:
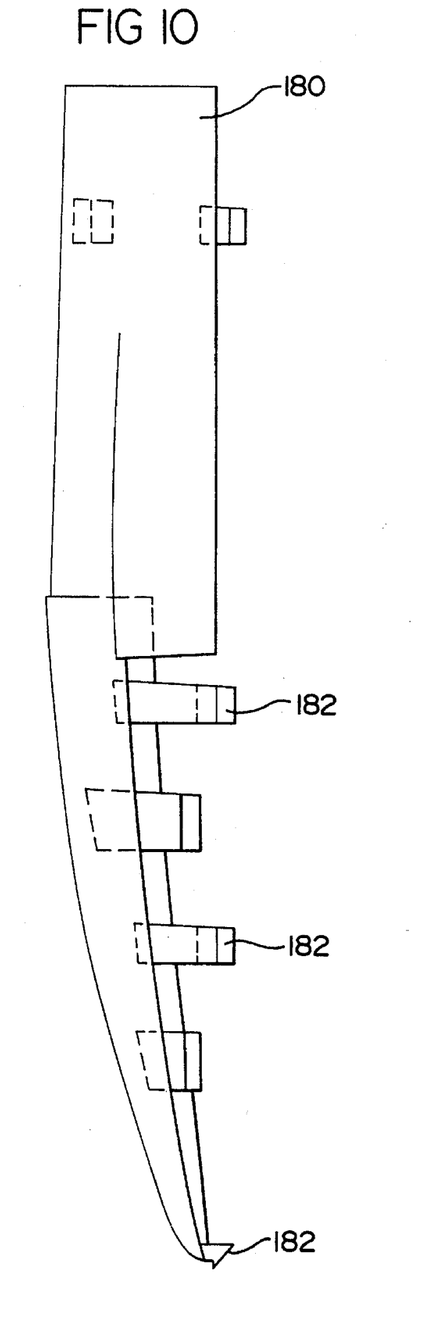
FIG. 10 is a side view of the end cap cover of the present invention.
Figure 11:
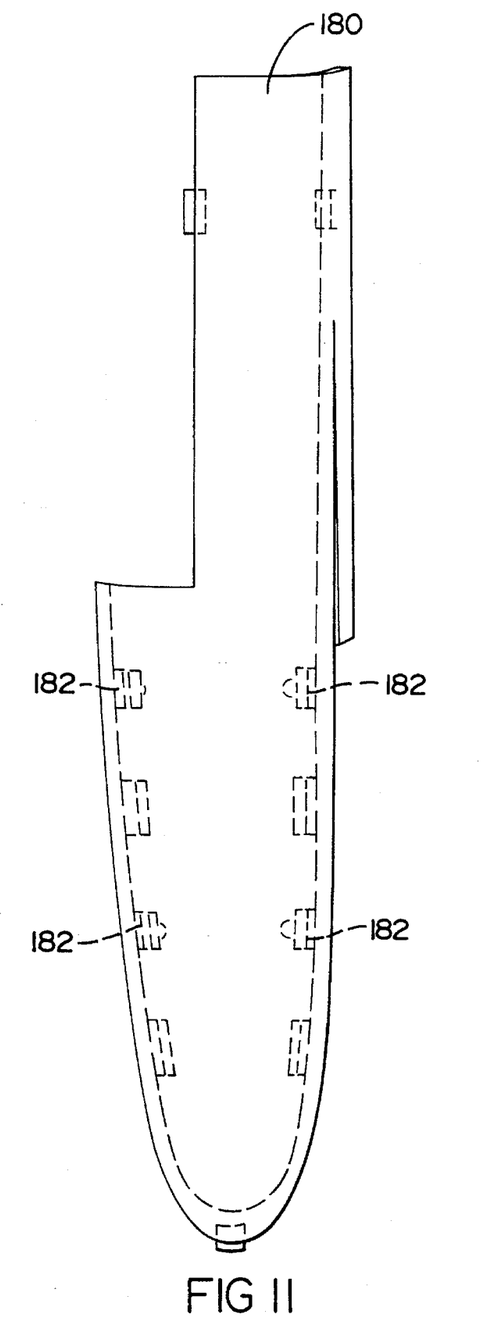
FIG. 11 is a top view of the end cap cover of the present invention.

Referring to FIGS. 10 and 11, there is shown an end cap cover 180. End cap cover 180 is adapted to fit over end cap 160. End cap cover 180 includes a plurality of engagement hooks 182 which are receivable within respective cooperating openings 184 in end cap 160 to affix end cap cover 180 to end cap 160. End cap cover 180 encloses crossbar loading notch 190 on side rail 16, therefore preventing the crossbar from being removed.

Having described the structural characteristics of the present invention, attention is now turned to the operational advantages of the article carrier assembly constructed in accordance therewith. The manual positioning and retention of the engager in response to the actuator lever from the recessed position where the crossbar is freely slidable to the latched position where the crossbar is fixed along the roof rail solves the problems associated with the prior art systems.

An individual desiring to move the crossbar assembly 38 along the roof rails 16 and 18 to a different lateral position simply depresses or pushes the end 111 of lever 96 to its recessed position, as shown in FIG. 3. Next, the individual travels around the automobile to the opposite support member 46, for example, and presses down on the end 111 of lever 96 to the recessed position. In this fashion, the entire crossbar 38 is now freely slidable along the length of the tracks 21.

In the preferred embodiment with the inner cavity 28, the crossbar may be moved along the entire length of the roof rails 16 and 18 without regard to the placement of the detents 22. When a desired crossbar position is reached, each lever 96 on the crossbars 38 and 40 must be depressed at end 110 as in FIG. 2, to urge the contact 61 outwardly toward engagement with the detent 22. The crossbar 38 is then slid to register the protrusion 120 with the next adjacent detent opening 36. Upon entering the opening 36 of the detent 22, the crossbar is fixed in a position along track 21. Opposite support member 46 is also similarly locked in position.

The present invention thereby obviates numerous trips back and forth to move the crossbar 38 past each detent 22 located on the roof rails. With the article carrier assembly of the present invention, an individual may bypass all intervening detents, for example detents 22, 148, 150, 152, in moving crossbar 38 from its position shown in FIG. 1, to a position corresponding to the location of detent 152. This is accomplished by the use of the latch 56 which moves the engager 59 from a releasable latched position to a recessed position in contrast to the prior art spring loaded systems.

It is also contemplated that the present invention may utilize a latch at only one end of a crossbar for securing the crossbar in a fixed position and a free sliding end simply following the movements of the latching end.

Having thus described the present invention, many modifications will become apparent to those of ordinary skill in the art to which it pertains without departing from the scope and spirit of the present invention as defined in the appended claims.

What is claimed is:

1. A crossbar for use with an article carrier, said article carrier having a roof rail including at least one detent, said crossbar comprising:

an elongated member;

a latch carried by the elongated member for releasably positioning the crossbar at the at least one detent, said latch having an external actuator and an engager having a contact;

said engager adapted for selectively positioning said contact at a recessed position disengaged from the rail, wherein said crossbar is freely slidable along the roof rail, and selectively positioning said contact in latched position engaging the roof rail at the at least one detent for securing said crossbar at a fixed position along the roof rail and means for resiliently urging said contact to said latched position; and a retainer for selectively maintaining said contact in said recessed position;

wherein said external actuator is a lever pivotably secured to said support member;

wherein said lever includes a flange and said retainer is an elastically deformable prong extending from said support member adapted to cooperate with said flange, whereby in said latched position said contact is received in said at least one detent, and in said recessed position said flange engages said prong to hold said contact outside said at least one detent; and said prong is elastically deformed when said flange travels from said latched position to said recessed position.

2. The crossbar as in claim 1 wherein said elongated member comprises a hollow tube and at least one support member affixed on said hollow tube whereby said latch is positioned on said support member.

3. The crossbar as defined in claim 2 wherein the roof rail includes a track and the at least one detent is disposed on said track, and wherein said elongated member further comprises a track follower on said support member for slidably engaging said track.

4. The invention as defined in claim 1 wherein said lever is spring biased toward said latched position in both said recessed and said latched position.

5. The crossbar as in claim 1 wherein said support member further includes an opening and said lever is supported within said opening.

6. The crossbar as in claim 1 wherein said lever and said support member have a corresponding contour.

7. The crossbar as in claim 1 wherein said engager comprises a protrusion and a protrusion support and said protrusion extends from said lever and is adapted to be receivable within said at least one detent.

8. An article carrier for attachment to an automobile rooftop comprising:

a pair of luggage roof rails affixed to said rooftop, each roof rail having a track extending along a portion of said rail and at least one detent disposed on said track;

an elongated crossbar having a first end and a second end;

a pair of support members for slidably connecting said crossbar to said roof rails, one of said pair affixed to the first end of said crossbar and the other of said pair connected to the second end of said crossbar, each support member including:

a track follower positioned on said support member for slidably engaging the track;

a latch affixed on said at least one support member for releasably positioning said crossbar along said track at the at least one detent, said latch having a protrusion and a protrusion support that selectively positions the protrusion in a recessed position wherein said support member is freely slidable along the track, and a latched position wherein said protrusion is urged toward engagement with said at least one detent for securing said crossbar at a fixed position along said track;

means for resiliently urging said protrusion support to said latched position; and a retainer for selectively maintaining said protrusion in said recessed position;

wherein said latch comprises a lever pivotably secured to said support;

wherein said lever includes a flange and said retainer is a prong extending from said support member adapted to cooperate with said flange, whereby in a latched position said protrusion is received in said at least one detent, and in said recessed position said flange engages said prong to hold said protrusion positioned outside said at least one detent; and wherein said prong is formed in one piece with said support member and resiliently deformable in said cooperation with said flange.

9. The article carrier as in claim 8 wherein said support member includes an opening and said lever is supported within said opening.

10. The article carrier as in claim 9 wherein said lever and said support have a corresponding contour.

11. The article carrier as in claim 10 wherein said protrusion extends from said lever and is adapted to be receivable within said at least one detent.

12. The article carrier of claim 8 wherein said support member and track follower are manufactured from one piece of material.

13. The article carrier as in claim 8 wherein said lever, protrusion, protrusion support arm and flange are all manufactured from one piece of material.

14. The article carrier as in claim 13 wherein said material is a thermoplastic.

15. The article carrier as in claim 8 wherein said means for resiliently urging said protrusion is a spring.

* * * * *